US012668446B2

(12) United States Patent
Wang et al.

(10) Patent No.: US 12,668,446 B2
(45) Date of Patent: Jun. 30, 2026

(54) DEVIATION CORRECTION APPARATUS AND WINDING MACHINE

(71) Applicant: CONTEMPORARY AMPEREX TECHNOLOGY (HONG KONG) LIMITED, Hong Kong (CN)

(72) Inventors: Peichao Wang, Ningde (CN); Yiruo Wang, Ningde (CN); Chao Xie, Ningde (CN); Guoda Huang, Ningde (CN); Shengsheng Hu, Ningde (CN); Gang Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 598 days.

(21) Appl. No.: 18/312,764

(22) Filed: May 5, 2023

(65) Prior Publication Data

US 2023/0356972 A1　　Nov. 9, 2023

(30) Foreign Application Priority Data

May 7, 2022　(CN) .......................... 202221068467.6

(51) Int. Cl.
　　*B65H 23/02*　　(2006.01)
　　*B65H 23/032*　　(2006.01)
　　*H01M 10/04*　　(2006.01)

(52) U.S. Cl.
　　CPC ....... *B65H 23/0204* (2013.01); *B65H 23/032* (2013.01); *H01M 10/0409* (2013.01); *B65H 2701/1315* (2013.01)

(58) Field of Classification Search
None
See application file for complete search history.

(56) References Cited

U.S. PATENT DOCUMENTS 4,562,417 A * 12/1985 Beal ....................... G11C 27/04
377/61
2010/0281685 A1 11/2010 Hori et al.
(Continued)

FOREIGN PATENT DOCUMENTS

| CN | 203165996 U | 8/2013 |
| CN | 107681202 A | 2/2018 |
| CN | 109738447 A | 5/2019 |

(Continued)

OTHER PUBLICATIONS

The European Patent Office (EPO) The Extended European Search Report for 23171853.7 Oct. 11, 2023 9 Pages.

(Continued)

*Primary Examiner* — Suman K Nath
(74) *Attorney, Agent, or Firm* — ANOVA LAW GROUP, PLLC

(57) ABSTRACT

A deviation correction apparatus includes a width detecting apparatus configured to detect a width of a coating layer of an electrode plate, a processor communicatively connected with the width detecting apparatus and configured to determine a centerline position of the electrode plate based on the width of the coating layer, and a deviation correction mechanism configured to perform deviation correction for the electrode plate based on the centerline position of the electrode plate and a preset standard centerline position.

11 Claims, 7 Drawing Sheets

(56) References Cited

U.S. PATENT DOCUMENTS

2023/0231205 A1 * 7/2023 Zeng ................... H01M 50/186
429/163
2024/0297330 A1 * 9/2024 Wang ................ H01M 10/0431

FOREIGN PATENT DOCUMENTS

| CN | 111416142 A | 7/2020 |
| CN | 212608476 U | 2/2021 |
| CN | 111416142 B | 3/2021 |
| CN | 213950104 U | 8/2021 |
| CN | 217086648 U | 7/2022 |
| JP | 2012236676 A | 12/2012 |

OTHER PUBLICATIONS

The World Intellectual Property Organization (WIPO) International Search Report and Written opinion for PCT/CN2023/092541 Jun. 21, 2023 15 pages (including English translation).

* cited by examiner

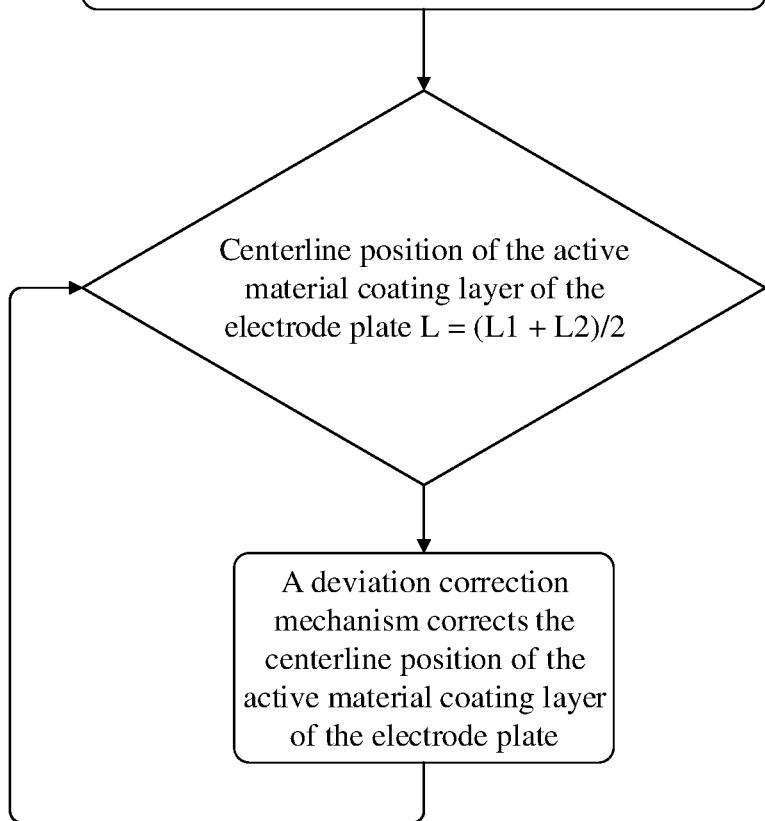

During a belt transport process of an electrode plate, a line scan camera detects edges of two sides of an active material coating layer of the electrode plate in real time and detects whether a reference label is fixed in a field of view of the camera The line scan camera outputs L1 and L2, where L1 is a distance from an edge of a side of the electrode plate without a tab to the reference label, and L2 is a distance from an edge of a side of an active material coating layer of the electrode plate with a tab to the reference label Centerline position of the active material coating layer of the electrode plate L = (L1 + L2)/2

A deviation correction mechanism corrects the centerline position of the active material coating layer of the electrode plate

FIG. 6

DEVIATION CORRECTION APPARATUS AND WINDING MACHINE

CROSS-REFERENCE TO RELATED APPLICATION

This application claims priority to Chinese Application No. 202221068467.6, filed on May 7, 2022, the entire content of which is incorporated herein by reference.

TECHNICAL FIELD

This application relates to the battery field, and specifically, to a deviation correction apparatus and a winding machine.

BACKGROUND

In the winding process of a battery cell, in order to improve the quality of a wound cell, deviation correction is performed by a deviation correction mechanism for an electrode plate.

In the related art, an edge position deviation correction technology is used, with an edge of a side without a tab as a deviation correction reference. In this deviation correction method, after a deviation is corrected by a deviation correction mechanism, it is still necessary to manually adjust the deviation correction reference to ensure the quality of the battery cell.

Therefore, efficient and accurate deviation correction for the electrode plate cannot be implemented by using existing deviation correction methods.

SUMMARY

This application is intended to provide a deviation correction apparatus and a winding machine, so as to implement efficient and accurate deviation correction for an electrode plate.

According to a first aspect, this application provides a deviation correction apparatus for deviation correction of an electrode plate, the electrode plate including a coating layer; where the deviation correction apparatus includes: a width detecting apparatus for detecting a width of the coating layer; a processor communicatively connected with the width detecting apparatus, configured to determine a centerline position of the electrode plate based on the width of the coating layer; and a deviation correction mechanism, configured to perform deviation correction for the electrode plate based on the centerline position of the electrode plate and a preset standard centerline position.

In the technical solution in this embodiment of this application, the width of the coating layer is detected to determine the centerline position of the electrode plate, and then the deviation correction is performed based on the centerline position and the preset standard centerline position. The width of the coating layer on the electrode plate may represent an effective electrode plate width, and a centerline position determined based on the width may represent the centerline position of the electrode plate. As compared with existing deviation correction schemes, a centerline of the electrode plate is used as a reference in center position deviation correction. When a width of the electrode plate is abnormal, the abnormal width part can be evenly divided to two sides of the electrode plate, so that centerlines of an anode plate and a cathode plate of the battery cell remain aligned, thereby avoiding that a result of the anode enclosing the cathode of the battery cell is out of specification after deviation correction, and the width change of the electrode plate can be more effectively handled. In addition, automatic deviation correction is performed by the deviation correction mechanism based on the centerline position, without manual intervention. Therefore, efficient and accurate deviation correction for the electrode plate can be implemented in the technical solution.

In some embodiments, the width detecting apparatus includes: a first detecting apparatus, where the first detecting apparatus has a detection range greater than a width of the electrode plate; and a reference label, where the reference label is provided on one side of the electrode plate, and the reference label is within the detection range of the first detecting apparatus; where the first detecting apparatus is configured to detect a distance between an edge of the coating layer and the reference label.

In the technical solution in this embodiment of this application, with the reference label being provided on one side of the electrode plate, the first detecting apparatus efficiently detects the width of the coating layer by detecting the distance between an edge of the coating layer and the reference label.

In some embodiments, the coating layer includes a first coating layer and a second coating layer disposed adjacently to each other in a preset direction; the first detecting apparatus is configured to detect a first distance between the reference label and an edge of the first coating layer on a side close to the reference label and a second distance between the reference label and an edge of the second coating layer on a side close to the reference label; and the processor is configured to determine a distance between the centerline position of the electrode plate and the reference label based on the first distance and the second distance, and determine a centerline position of the electrode plate based on the distance between the centerline position of the electrode plate and the reference label and a position of the reference label.

In the technical solution in this embodiment of this application, the first detecting apparatus separately detects the first distance and the second distance based on the first coating layer and the second coating layer disposed adjacently to each other in the preset direction, can determine a distance between the centerline position of the electrode plate and the reference label based on the first distance and the second distance, and can efficiently and accurately determine a centerline position of the electrode plate based on the distance.

In some embodiments, the distance between the centerline position of the electrode plate and the reference label is expressed as: $L=(L1+L2)/2$, where L1 is the first distance, and L2 is the second distance.

In the technical solution in this embodiment of this application, because the first coating layer and the second coating layer are disposed adjacently to each other in the preset direction, the distance between the centerline position of the electrode plate and the reference label can be determined simply by taking half-sum of the first distance and the second distance.

In some embodiments, the first coating layer is an active material coating layer of the electrode plate and the second coating layer is a protective coating layer of the electrode plate.

In the technical solution in this embodiment of this application, the active material coating layer of the electrode plate is equivalent to a target coating layer for which deviation correction needs to be performed, and the protective coating layer of the electrode plate is equivalent to a protective layer of the electrode plate. Through the foregoing deviation correction method, a centerline position of the target coating layer for which deviation correction needs to be performed is determined efficiently and accurately.

In some embodiments, the first detecting apparatus is a line scan camera.

In the technical solution in this embodiment of this application, the line scan camera can be used to implement width detection in a large range, ensuring efficient detection of the width of the coating layer.

In some embodiments, the coating layer includes the first coating layer and the second coating layer disposed adjacently to each other in the preset direction; the width detecting apparatus includes: a first edge detecting apparatus, configured to detect a first detection value of a side edge of the first coating layer away from the second coating layer; a second edge detecting apparatus, configured to detect a second detection value of a side edge of the second coating layer away from the first coating layer; and a second detecting apparatus, configured to detect a width of the second coating layer in the preset direction; and the processor is configured to: obtain a spacing between a disposing position of the first edge detecting apparatus and a disposing position of the second edge detecting apparatus; based on the first detection value, the second detection value, the spacing, and the width of the second coating layer in the preset direction, determine a distance between the centerline position of the electrode plate and the side edge of the first coating layer away from the second coating layer; and determine a centerline position of the electrode plate based on a position of the side edge of the first coating layer away from the second coating layer and the distance.

In the technical solution in this embodiment of this application, the first edge detecting apparatus is used to detect the first detection value, the second edge detecting apparatus is used to detect the second detection value, and the second detecting apparatus is used to detect the width of the second coating layer. Then, the processor determines the distance between the centerline position of the electrode plate and the side edge of the first coating layer away from the second coating layer based on the first detection value, the second detection value, the spacing, and the width of the second coating layer, and efficiently and accurately determines the centerline position of the electrode plate based on the distance. Because detection can be performed for an edge of a coating layer, when the electrode plate includes a plurality of coating layers, the processor can be adapted to accurately determine a width of a specific coating layer and a centerline position of the specific coating layer.

In some embodiments, the distance is expressed as: $L=(L3+L4+L5-W)/2$, where $L3$ is the first detection value, $L4$ is the second detection value, $L5$ is the spacing, and W is the width of the second coating layer in the preset direction.

In the technical solution in this embodiment of this application, a distance is accurately determined by using the foregoing formula for distance calculation.

In some embodiments, the first coating layer is an active material coating layer of the electrode plate and the second coating layer is a protective coating layer of the electrode plate.

In the technical solution in this embodiment of this application, the active material coating layer of the electrode plate is equivalent to a target coating layer for which deviation correction needs to be performed, and the protective coating layer of the electrode plate is equivalent to a protective layer of the electrode plate. Through the foregoing deviation correction method, a centerline position of the target coating layer for which deviation correction needs to be performed is determined efficiently and accurately.

In some embodiments, the first edge detecting apparatus and the second edge detecting apparatus are photoelectric sensors, and the second detecting apparatus is an area scan camera.

In the technical solution in this embodiment of this application, the photoelectric sensors can be used to efficiently determine a corresponding edge detection value, and the area scan camera can be used to efficiently detect a width in a small range.

According to a second aspect, this application provides a winding machine, including: a winding mandrel, configured to wind a first electrode plate, a separator, and a second electrode plate; and the deviation correction apparatus according to the first aspect and any one of the implementations of the first aspect, configured to perform deviation correction for the first electrode plate and the second electrode plate, so that an error between a centerline of the first electrode plate and/or the second electrode plate and a preset centerline is kept within a predetermined range, thereby ensuring alignment of the first electrode plate and the second electrode plate in a wound electrode assembly.

In the technical solutions in the embodiments of this application, the foregoing deviation correction apparatus is used to perform deviation correction for the first electrode plate and the second electrode plate, so that an error between a centerline of the first electrode plate and/or the second electrode plate and a preset centerline is kept within a predetermined range, thereby ensuring alignment of the first electrode plate and the second electrode plate in a wound electrode assembly, which improves a yield of superior wound cells, reduces scrapping of the wound cells caused by a difference in the width of the electrode plate, reduces difficulty of operation by a staff member, and further improves the quality of the wound cells.

BRIEF DESCRIPTION OF DRAWINGS

In order to describe the technical solutions in the embodiments of this application more clearly, the following briefly describes the accompanying drawings required for describing the embodiments of this application. It is appreciated that the accompanying drawings below only show some embodiments of this application and thus should not be considered as limitations on the scope. Persons of ordinary skill in the art may still derive other related drawings from the accompanying drawings without creative efforts.

FIG. 6 is a diagram of a deviation correction process according to an embodiment of this application;

Figure 1:
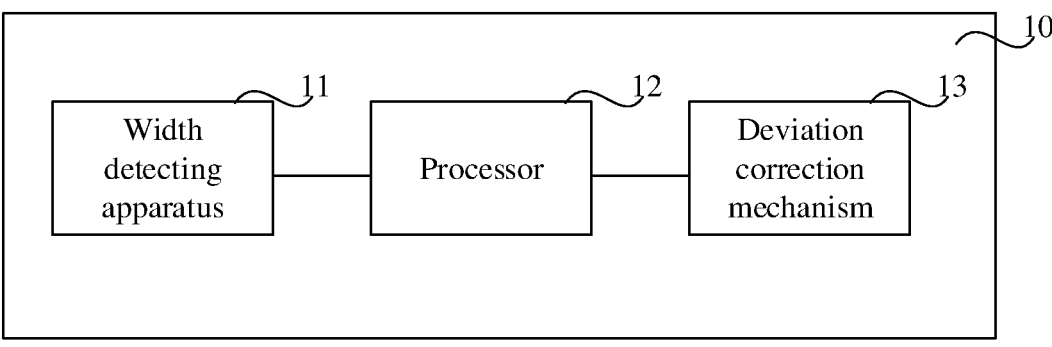
FIG. 1 is a schematic structural diagram of a deviation correction apparatus according to an embodiment of this application.

Reference signs: 10. deviation correction apparatus; 11. width detecting apparatus; 110. first detecting apparatus; 111. reference label; 112. first edge detecting apparatus; 113. second edge detecting apparatus; 114. second detecting apparatus; 12. processor; 13. deviation correction mechanism; 20. electrode plate; 21. coating layer; 210. first coating layer; 211. second coating layer; 22. first electrode plate; 23. second electrode plate; 30. separator; 50. winding machine; and 51. winding mandrel.

DESCRIPTION OF EMBODIMENTS

The following describes in detail the embodiments of technical solutions in this application with reference to the accompanying drawings. The following embodiments are merely used to describe the technical solutions in this application more explicitly, and therefore they are merely used as examples and do not constitute any limitation on the protection scope of this application.

Unless otherwise defined, all technical and scientific terms used herein shall have the same meanings as commonly understood by persons skilled in the art to which this application belongs. The terms used herein are merely intended to describe the specific embodiments but not intended to constitute any limitation on this application. The terms "include", "comprise", and any other variations thereof in the specification, the claims and the foregoing brief description of drawings of this application are intended to cover a non-exclusive inclusion.

In the descriptions of the embodiments of this application, the terms "first", "second", and the like are merely intended to distinguish between different objects, and shall not be understood as any indication or implication of relative importance or any implicit indication of the number, specific sequence, or primary-secondary relationship of the technical features indicated. In the descriptions of the embodiments of this application, "a plurality of" means at least two unless otherwise specifically stated.

In this specification, reference to "embodiment" means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with another embodiment.

In the descriptions of the embodiments of this application, the term "and/or" describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the descriptions of the embodiments of this application, the term "a plurality of" means more than two (inclusive). Similarly, "a plurality of groups" means more than two (inclusive) groups, and "a plurality of pieces" means more than two (inclusive) pieces.

In the descriptions of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or elements mentioned needs to have specific orientations or needs to be constructed or manipulated according to specific orientations, and therefore shall not be construed as any limitation on the embodiments of this application.

In the descriptions of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an internal communication or interaction between two elements. Persons of ordinary skill in the art can understand specific meanings of these terms in the embodiments of this application as appropriate to specific situations.

Currently, from a perspective of market development, application of batteries is becoming more and more extensive. Batteries have been widely used in energy storage power supply systems such as hydroelectric power plants, thermal power plants, wind power plants, and solar power plants, and many other fields including electric transportation tools such as electric bicycles, electric motorcycles, and electric vehicles, military equipment, and aerospace. With continuous expansion of application fields of batteries, market demands for the batteries are also expanding.

In the winding and formation processes of a battery, in order to improve the quality of a wound cell, deviation correction may be performed by a deviation correction mechanism for an electrode plate.

In existing deviation correction mechanisms or methods, an edge position deviation correction technology is used, with an edge of a side of the electrode plate without a tab as a deviation correction reference. After deviation correction by a deviation correction mechanism, a width of an anode plate and/or a cathode plate will change. If only an edge of the electrode plate is used as a reference for deviation correction, a result of the anode enclosing the cathode on the tab side of the battery cell may be out of specification, resulting in a defective battery cell being scrapped. Therefore, it is necessary to manually adjust the deviation correction reference to ensure the quality of battery cells.

Thus, the existing deviation correction technology cannot essentially achieve effective deviation correction of the electrode plate, thereby resulting in the fact that the quality of the battery cells cannot be guaranteed.

After careful consideration by the applicant, the reason why the related art cannot implement effective deviation correction is edge position deviation correction being used based on an edge of a side without a tab. Edge position deviation correction does not take an effective width of the electrode plate into account, but considers only an edge position of the electrode plate. In this way, in the edge position deviation correction based on the edge of the side without a tab, the deviation correction is not performed based on the effective width of the electrode plate. Therefore, when the electrode plate changes in width, manual adjustment is required to avoid the abnormality of the electrode plate width.

The deviation correction reference of the edge position deviation correction is not an effective width of the electrode plate. Therefore, if the deviation correction is performed based on electrode plate positions that can represent the effective width, no matter how the width of the electrode plate changes, no manual adjustment is required.

Based on this, in the technical solutions in the embodiments of this application, a width of a coating layer on an electrode plate is detected to determine a centerline position of the electrode plate, and then the deviation correction is performed based on the centerline position and a preset standard centerline position. The width of the coating layer on the electrode plate can represent the effective electrode plate width. For example, the electrode plate generally includes one or more coating layers provided in a preset direction. When there is one coating layer provided, the coating layer may cover an entire surface of the electrode plate. In this case, the width of the coating layer is the effective electrode plate width of the electrode plate. When there are a plurality of coating layers provided, the plurality of coating layers jointly cover the entire surface of the module. In this case, a width of a specific coating layer (a coating layer occupying most of the width) may be regarded as the effective electrode plate width of the electrode plate. Then, a centerline position determined based on the width may represent the centerline position of the effective electrode plate width.

Therefore, in this technical solution, the centerline of the effective electrode plate width is used as the deviation correction reference. When the width of the electrode plate is abnormal, the deviation correction apparatus performs deviation correction based on the centerline of the effective electrode plate width, and the abnormal width part is evenly divided to two sides, so that centerlines of effective electrode plate areas of the anode plate and the cathode plate of the battery cell remain aligned, thereby avoiding that a result of the anode enclosing the cathode of the battery cell is out of specification, and the width change of the electrode plate can be more effectively handled. In addition, no manual intervention is required in the deviation correction.

The technical solution provided by the embodiments of this application may be applied in the winding process of the battery, to implement deviation correction of the electrode plate by using the deviation correction apparatus and to implement the winding and formation of the battery cell after deviation correction by using the winding machine.

In an embodiment of this application, the electrode plate includes a coating layer. In some embodiments, only one coating layer is provided on the electrode plate. In some other embodiments, a plurality of coating layers are provided on the electrode plate.

Figure 2:
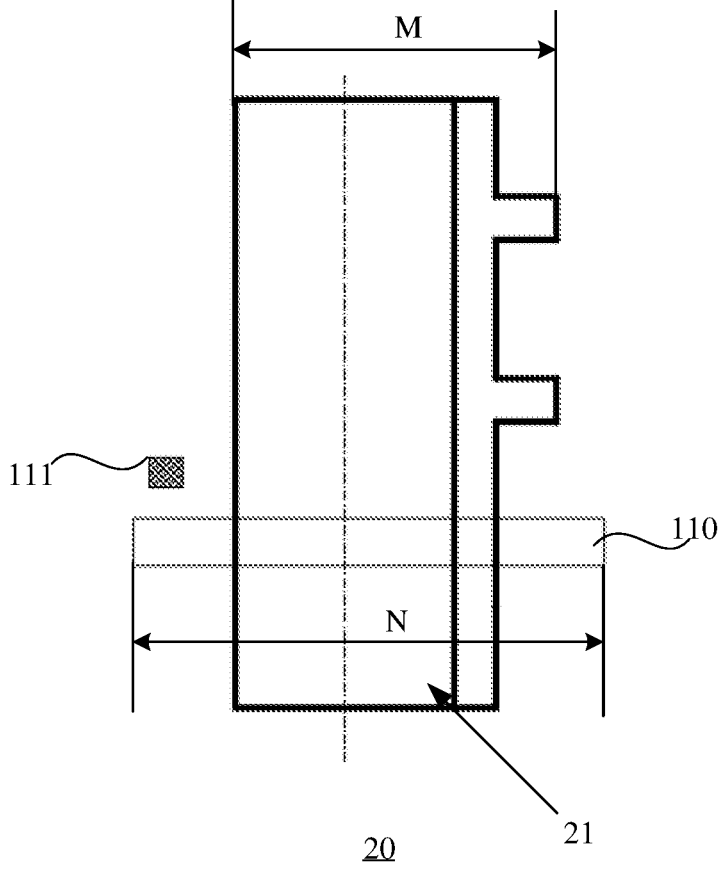
FIG. 2 is a schematic diagram of an electrode plate and a width detecting apparatus according to an embodiment of this application.

Based on the descriptions of the foregoing inventive ideas and the application scenarios, the following is described with reference to FIG. 1 and FIG. 2. FIG. 1 is a schematic structural diagram of a deviation correction apparatus 10 according to an embodiment of this application, and FIG. 2 is a schematic diagram of an electrode plate 20. The deviation correction apparatus 10 is applied to the electrode plate 20, the electrode plate 20 includes a coating layer 21, and the deviation correction apparatus 10 includes a width detecting apparatus 11, a processor 12, and a deviation correction mechanism 13.

The width detecting apparatus 11 is configured to detect a width of the coating layer 21.

The processor 12 is communicatively connected with the width detecting apparatus 11 and is configured to determine a centerline position of the electrode plate 20 based on the width of the coating layer 21.

The deviation correction mechanism 13 is configured to perform deviation correction for the electrode plate 20 based on the centerline position of the electrode plate 20 and a preset standard centerline position.

In some embodiments, the electrode plate 20 includes one coating layer 21, and the width detecting apparatus 11 detects a width of the coating layer 21. Correspondingly, the processor 12 determines a centerline position of the electrode plate 20 based on the width of the coating layer 21.

In some embodiments, the electrode plate 20 includes a plurality of coating layers 21, and the width detecting apparatus 11 needs to detect widths of the plurality of coating layers 21. Correspondingly, the processor 12 determines a centerline position of the electrode plate 20 based on the widths of the plurality of coating layers 21.

The deviation correction mechanism 13 is configured to compare the preset standard centerline position and the detected centerline position of the electrode plate 20 to obtain a deviation therebetween, and then perform deviation correction on the centerline position based on the deviation.

In some embodiments, the deviation correction mechanism 13 may include a controller and a deviation correction motor. The controller is configured to determine a deviation correction strategy of the deviation correction motor according to the deviation between the preset standard centerline position and the detected centerline position of the electrode plate 20, and then control the deviation correction motor based on the deviation correction strategy, so that the deviation correction motor can drive the electrode plate 20 to move, and then make the centerline position of the electrode plate 20 meet a requirement for the standard centerline position.

For example, if the detected centerline position is shifted to the left compared with the standard centerline position, then the electrode plate 20 can be controlled to move to the right for a distance by a deviation correction motor to avoid the deviation, so that the centerline position of the electrode plate meets the requirement for the standard centerline position.

In some other embodiments, based on the centerline position of the electrode plate 20 and the preset standard centerline position, the deviation correction mechanism 13 may alternatively use other implementations to correct the deviation. This is not limited in this embodiment of this application.

In the technical solution in the embodiments of this application, the width of the coating layer is detected to determine the centerline position of the electrode plate 20, and then the deviation correction is performed based on the centerline position and the preset standard centerline position. The width of the coating layer on the electrode plate 20 may represent an effective electrode plate width, and a centerline position determined based on the width may represent the centerline position of the electrode plate 20. As compared with existing deviation correction schemes, a centerline of the electrode plate 20 is used as a reference in center position deviation correction. When a width of the electrode plate 20 is abnormal, the abnormal width part can be evenly divided to two sides of the electrode plate 20, so that centerlines of the anode plate and the cathode plate of the battery cell remain aligned, thereby avoiding that a result of the anode enclosing the cathode of the battery cell is out of specification after deviation correction so that the width change of the electrode plate 20 can be more effectively handled. In addition, automatic deviation correction is performed by the deviation correction mechanism 13 based on the centerline position, without manual intervention. Therefore, efficient and accurate deviation correction for the electrode plate can be implemented in the technical solution 20.

Refer to FIG. 2. In an optional implementation, the width detecting apparatus 11 includes a first detecting apparatus 110 and a reference label 111. The first detecting apparatus 110 has a detection range N greater than a width M of the electrode plate 20. The reference label 111 is provided on one side of the electrode plate 20, and the reference label 111 is within the detection range N of the first detecting apparatus 110. The first detecting apparatus 110 is configured to detect a distance between the reference label 111 and an edge of the coating layer on a side away from the reference label 111.

In some embodiments, if only one coating layer 21 is provided on the electrode plate 20, the first detecting apparatus 110 may detect distances between edges of the coating layer 21 on two sides and the reference label 111.

In some other embodiments, if a plurality of coating layers 21 are provided in a preset direction on the electrode plate 20, the first detecting apparatus 110 may detect distances between the reference label 111 and edges of the plurality of coating layers 21 on a side close to the reference label 111, respectively.

In different implementations, based on the distances between corresponding edges of the coating layers 21 and the reference label 111, a distance between a centerline position of the electrode plate 20 and a position of the reference label 111 can be determined, and then based on a disposing position of the reference label 111, a centerline position of the electrode plate 20 can be determined.

In the technical solution in the embodiments of this application, with the reference label 111 being provided on one side of the electrode plate 20, the first detecting apparatus 110 efficiently detects the width of the coating layer 21 by detecting the distance between an edge of the coating layer and the reference label 111, and then based on a position of the reference label 111, a centerline position of the electrode plate 20 can be determined.

It can be understood that when there are a plurality of coating layers 21, only the center of a specific coating layer may be the center of the effective width of the electrode plate 20. In this case, if no reference label 111 is provided, the center of the specific coating layer cannot be determined. Therefore, the reference label 111 provided can be used not only for determining the center position of the electrode plate 20 with a single coating layer, but also for determining the center position of the electrode plate 20 with a plurality of coating layers.

Figure 3:
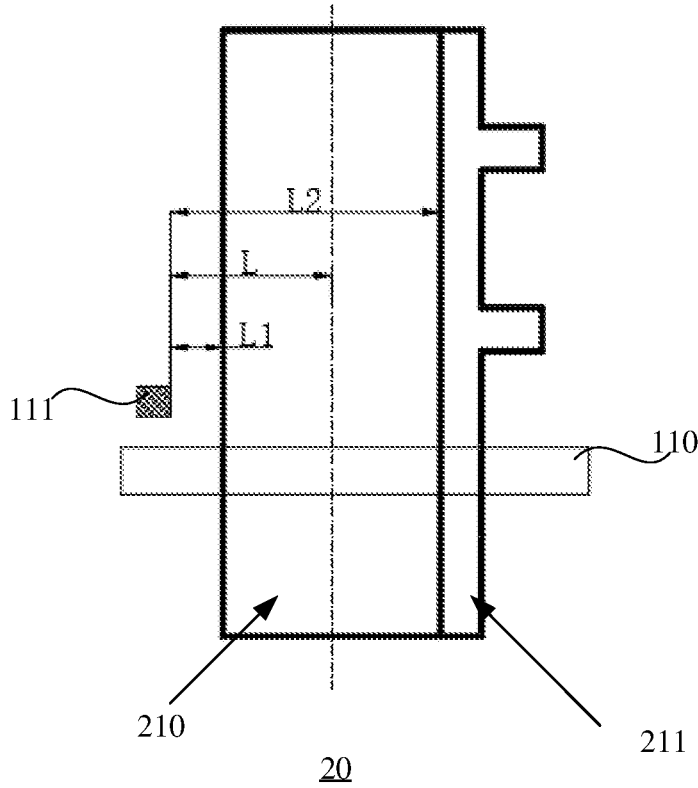
FIG. 3 is a schematic diagram of an electrode plate and a width detecting apparatus according to an embodiment of this application.

Refer to FIG. 3. In an optional implementation, the coating layer 21 includes a first coating layer 210 and a second coating layer 211 disposed adjacently to each other in a preset direction. In this case, the first detecting apparatus 110 is configured to detect a first distance L1 between the reference label 111 and an edge of the first coating layer 210 on a side close to the reference label 111 and a second distance L2 between the reference label 111 and an edge of the second coating layer 211 on a side close to the reference label 111; and the processor 12 is configured to determine a distance L between the centerline position of the electrode plate 20 and the reference label 111 based on the first distance L1 and the second distance L2, and determine a centerline position (that is, a dotted line position in the figure) of the electrode plate 20 based on the distance L between the centerline position of the electrode plate 20 and the reference label 111 and a position of the reference label 111.

In such implementation, the preset direction may be from left to right, from right to left, from top to bottom, from bottom to top, or the like. This is not limited herein.

As can be seen from FIG. 3, although two coating layers 21 are included in FIG. 3, the effective width of the electrode plate 20 is the width of the first coating layer 210, and the effective electrode plate width calculated is the width of the first coating layer 210, which means that a width of a specific coating layer is regarded as the effective width of the electrode plate 20. Such implementation is suitable for an application scenario in which width change of the electrode plate 20 is related to the first coating layer 210 but not to the second coating layer 211.

In some other embodiments, if the width change of the electrode plate 20 involves width changes of a plurality of coating layers 21, the widths of the plurality of coating layers 21 should be collectively regarded as the effective width of the electrode plate 20.

In the technical solution in the embodiments of this application, the first detecting apparatus 110 separately detects the first distance L1 and the second distance L2 based on the first coating layer 210 and the second coating layer 211 disposed adjacently to each other in the preset direction, can determine a distance L between the centerline position of the electrode plate 20 and the reference label 111 based on the first distance L1 and the second distance L2, and can efficiently and accurately determine a centerline position of the electrode plate 20 based on the distance L.

In FIG. 3, based on values of the first distance L1 and the second distance L2, in an optional implementation, the distance L between the centerline position of the electrode plate 20 and the reference label 111 is expressed as: $L=(L1+L2)/2$.

As shown in FIG. 3, it can be seen that $L=(L2-L1)/2+L1$, which can be simplified to get: $L=(L1+L2)/b 2$.

In the technical solution in the embodiments of this application, because the first coating layer 210 and the second coating layer 211 are disposed adjacently to each other in the preset direction, the distance L between the centerline position of the electrode plate 20 and the reference label 111 can be determined simply by taking half-sum of the first distance L1 and the second distance L2 (simplified determining method).

Based on such method for determining the distance, it can be understood that when the coating layer 21 includes only one coating layer 21, the first distance L1 may be equivalent to a distance L between the reference label 111 and an edge of the coating layer on a side close to the reference label 111, and the second distance L2 may be equivalent to a distance between the reference label 111 and an edge of the coating layer 21 on a side away from the reference label 111. Therefore, the distance between the centerline position of the electrode plate 20 and the reference label 111 in this case can still be calculated by the above calculation formula, but L2 represents a distance between the reference label 111 and an edge of the coating layer 21 on a side away from the reference label 111.

In this embodiment of this application, the distances should be understood as the shortest distances detected between two components, that is, excluding a distance measured in an oblique direction.

In an optional implementation, when the electrode plate 20 is an anode plate, the first coating layer 210 is an active material coating layer of the electrode plate, and the second coating layer 211 is a protective coating layer of the electrode plate.

It can be understood that when the electrode plate 20 is a cathode plate, the first coating layer 210 and second coating layer 211 correspond to a coating layer arrangement of the cathode plate.

In the technical solution in the embodiments of this application, the active material coating layer of the electrode plate is equivalent to a target coating layer for which deviation correction needs to be performed, and the protective coating layer of the electrode plate is equivalent to a protective layer of the electrode plate 20, which also means that a width of the active material coating layer of the electrode plate is the effective width of the electrode plate 20. Through the foregoing deviation correction method, a centerline position of the target coating layer for which deviation correction needs to be performed is determined efficiently and accurately.

In addition, in some embodiments, the electrode plate 20 may also include more coating layers 21. In this case, on the basis of ensuring that the distance between the centerline position of the electrode plate 20 and the reference label 111 can be determined based on distances between at least one side edge of each of the coating layers 21 and the reference label 111, the formula for calculating the distance or the method for detecting the distance can be flexibly set. This is not limited in this embodiment of this application.

In this embodiment of this application, the largest detection range of the first detecting apparatus 110 should meet the requirement for the farthest distance between an edge of the coating layer 21 and the reference label 111. For example: the largest detection range of the first detecting apparatus 110 should be greater than a distance between the reference label 111 and an edge of the coating layer 21 on a side farthest away from the reference label 111.

In some embodiments, the first detecting apparatus 110 may be a line scan camera.

A line scan camera is a camera that uses a line scan image sensor and implements distance detection based on a two-dimensional image. The line scan camera is used in the following two scenarios: 1. a scenario in which a field of view to be detected is an elongated ribbon, which is mostly used for inspection on a roller; and 2. a scenario in which an extremely large field of view or extremely high precision is required In the technical solution in the embodiments of this application, the line scan camera can be used to implement width detection in a large range, ensuring efficient detection of the width of the coating layer 21.

An area scan camera is a camera that can capture an image all at once and acquire images in a timely manner. The camera has a wide range of applications, such as for measurement of area, shape, size, position, and even temperature. This camera can quickly and accurately capture two-dimensional image information and has a very intuitive image measurement effect.

Compared with the line scan camera, the area scan camera has a smaller measurement range and different applicable measurement objects.

Therefore, in some other embodiments, if the farthest distance between an edge of the coating layer 21 and the reference label 111 is not very large, a detecting apparatus with a small detection range may alternatively be used in this case, such as an area scan camera. This is not limited herein.

In some embodiments, other distance detecting apparatuses may alternatively be used to detect a distance between an edge of the coating layer 21 and the reference label 111, such as a laser sensor and an infrared sensor. This is not limited in this embodiment of this application.

In addition, the reference label 111 is only used as a distance detection reference and can be flexibly implemented in a variety of manners, for example, as an identification plate, an identification line, or other identification objects. This is not limited herein.

As described in the foregoing embodiments, the coating layer 21 on the electrode plate 20 may be a single coating layer or a plurality of coating layers. When a plurality of coating layers are present on the electrode plate 20, in addition to the foregoing implementations, other implementations may be used to determine a centerline position of the electrode plate 20.

Figure 4:
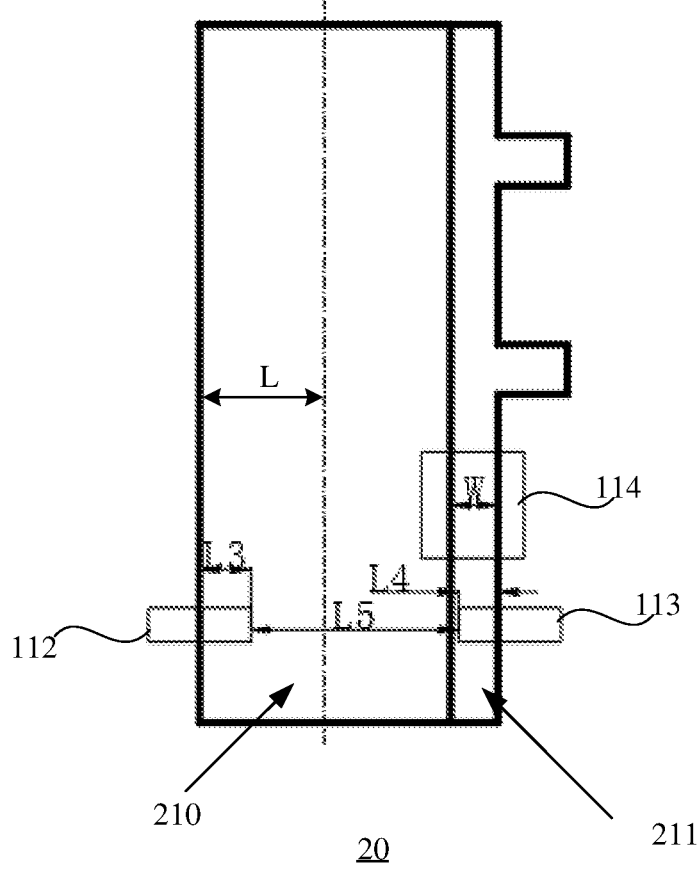
FIG. 4 is a schematic diagram of an electrode plate and a width detecting apparatus according to an embodiment of this application.

Refer to FIG. 4. In an optional implementation, the coating layer 21 includes a first coating layer 210 and a second coating layer 211 disposed adjacently to each other in a preset direction. The width detecting apparatus 11 includes a first edge detecting apparatus 112, a second edge detecting apparatus 113, and a second detecting apparatus 114. The first edge detecting apparatus 112 is configured to detect a first detection value L3 of a side edge of the first coating layer 210 away from the second coating layer 211. The second edge detecting apparatus 113 is configured to detect a second detection value L4 of a side edge of the second coating layer 211 away from the first coating layer 210. The second detecting apparatus 114 is configured to detect a width W of the second coating layer in the preset direction.

The processor 12 is configured to: obtain a spacing L5 between a disposing position of the first edge detecting apparatus 112 and a disposing position of the second edge detecting apparatus 113; based on the first detection value L3, the second detection value L4, the spacing L5, and the width W, determine a distance L between the centerline position of the electrode plate 20 and the side edge of the first coating layer away from the second coating layer; and determine a centerline position of the electrode plate 20 based on a position of the side edge of the first coating layer 210 away from the second coating layer 211 and the distance L.

In such implementation, for how the first coating layer 210 and the second coating layer 211 are disposed, refer to the descriptions in the foregoing embodiments. Details are not repeated herein.

The first edge detecting apparatus 112 can directly acquire the first detection value L3. The second edge detecting apparatus 113 can directly acquire the second detection value L4.

The second detecting apparatus 114 detects a width of the second coating layer 211 in the preset direction, that is, W in the figure. In some embodiments, if the second coating layer 211 has a regular shape, the widths of different positions of the second coating layer 211 are consistent, and the second detecting apparatus 114 may be provided at any position of the second coating layer 211 in a preset direction.

In some other embodiments, if the second coating layer 211 has an irregular shape, for example, has a protruding tab portion, the widths of different positions of the second coating layer 211 may be inconsistent. In this case, the second detecting apparatus 114 may be provided at a specified position of the second coating layer 211 in the preset direction. A width of the specified position should be consistent with widths of most positions of the second coating layer 211 in the preset direction. For example: the specified position cannot be a protruding position of the tab.

As shown in FIG. 4, if only the first detection value L3, the second detection value L4, and the width W are detected, the centerline position cannot be determined. Therefore, a spacing L5 between disposing positions of the two edge detecting apparatuses also needs to be determined.

Assuming that the first detection value L3 is a distance between one side of the first edge detecting apparatus 112 and a corresponding edge, and that the second detection value L4 is a distance between one side of the second edge detecting apparatus 113 and a corresponding edge, then the spacing L5 between the disposing positions of the two edge detecting apparatuses should be: a distance between the one side of the first edge detecting apparatus 112 and the one side of the second edge detecting apparatus 113.

Further, the processor 12 can determine a distance L between the centerline position of the electrode plate 20 and the side edge of the first coating layer 210 away from the second coating layer 211 based on the first detection value L3, the second detection value L4, the spacing L5, and the width W, and can determine a centerline position of the electrode plate 20 based on the distance L and in combination with a position on the side edge of the first coating layer 210 away from the second coating layer 211.

In the technical solution in the embodiments of this application, the first edge detecting apparatus 112 is used to detect the first detection value L3, the second edge detecting apparatus 113 is used to detect the second detection value L4, and the second detecting apparatus 114 is used to detect the width W of the second coating layer. Then, the processor 12 determines the distance L between the centerline position of the electrode plate 20 and the side edge of the first coating layer 210 away from the second coating layer 211 based on the first detection value L3, the second detection value L4, the spacing L5, and the width W of the second coating layer, and efficiently and accurately determines a centerline position of the electrode plate 20 based on the distance L.

In an optional implementation, the distance L between centerline position of the electrode plate 20 and a side edge of the first coating layer away from the second coating layer is expressed as: $L=(L3+L4+L5-W)/2$.

In the technical solution in the embodiments of this application, a distance is accurately determined by using the foregoing formula for distance calculation.

In such implementation, the first coating layer 210 may be an active material coating layer of the electrode plate, and the second coating layer 211 may be a protective coating layer of the electrode plate.

In the technical solution in the embodiments of this application, the active material coating layer of the electrode plate is equivalent to a target coating layer for which deviation correction needs to be performed, and the protective coating layer of the electrode plate is equivalent to a protective layer of the electrode plate 20, which means that a width of the active material coating layer of the electrode plate is the effective width of the electrode plate 20. Through the foregoing deviation correction method, a centerline position of the target coating layer for which deviation correction needs to be performed is determined efficiently and accurately.

In an optional implementation, the first edge detecting apparatus 112 and the second edge detecting apparatus 113 are photoelectric sensors, and the second detecting apparatus 114 is an area scan camera.

A photoelectric sensor is a device that converts optical signals into electrical signals and is able to implement accurate distance detection based on the photoelectric effect. Therefore, the photoelectric sensor can implement distance detection between one side of the photoelectric sensor and a corresponding edge, to obtain an edge detection value.

In the technical solution in the embodiments of this application, the photoelectric sensors can be used to efficiently determine a corresponding edge detection value, and the area scan camera can be used to efficiently detect a width in a small range.

In some other embodiments, the first edge detecting apparatus 112 and the second edge detecting apparatus 113 may alternatively be other sensors capable of edge detection, such as a laser sensor and an infrared sensor. This is not limited herein.

In addition, the area scan camera may also be implemented by other detecting apparatuses capable of width detection, for example, a laser sensor and an infrared sensor or the like which are respectively disposed on two side edges of the second coating layer 211. However, in this case, the width of the second coating layer 211 needs to be determined in combination with the detection values of the sensors on the two side edges. This is not limited in this embodiment of this application.

Figure 5:
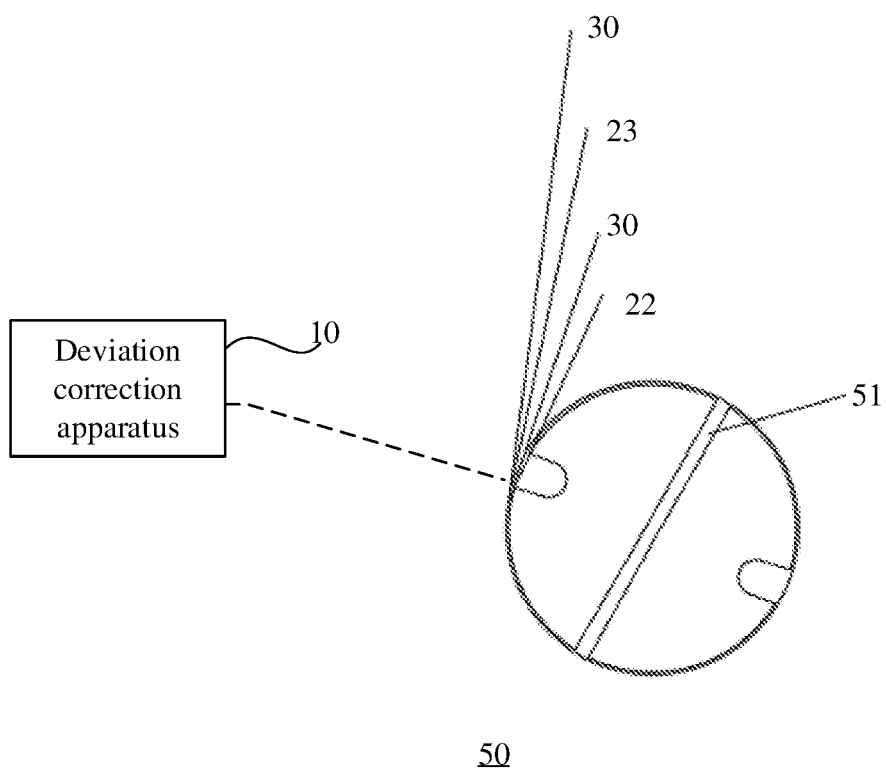
FIG. 5 is a schematic structural diagram of a winding machine according to an embodiment of this application.

Referring to FIG. 5, an embodiment of this application further provides a winding machine 50. The winding machine 50 includes:

a winding mandrel 51, configured to wind a first electrode plate 22, a separator 30, and a second electrode plate 23; and a deviation correction apparatus 10, configured to perform deviation correction for the first electrode plate 22 and the second electrode plate 23, so that an error between a centerline of the first electrode plate 22 and/or the second electrode plate 23 and a preset centerline is kept within a predetermined range, thereby ensuring alignment of the first electrode plate 22 and the second electrode plate 23 in a wound electrode assembly.

The first electrode plate 22 may be the anode plate described in the foregoing embodiments, and the second electrode plate 23 may be the cathode plate described in the foregoing embodiments. Alternatively, the first electrode plate 22 is a cathode plate, and the second electrode plate 23 is an anode plate. This is not limited herein.

It should be noted that the implementation of the deviation correction apparatus 10 in FIG. 5 is not unique. Therefore, no specific structure of the deviation correction apparatus 10 is shown in FIG. 5.

In combination with the descriptions of the deviation correction apparatus 10 in the foregoing embodiments, it can be seen that through the deviation correction by the deviation correction apparatus 10, centerlines of the anode plate and the cathode plate of the battery cell can remain aligned, that is, an error between a centerline of the first electrode plate 22 and/or the second electrode plate 23 and a preset centerline is kept within a predetermined range. In other words, centerlines of the anode plate and the cathode plate are wound on a same line during the battery cell winding process. Further, alignment of the anode plate and the cathode plate in the wound electrode assembly is also guaranteed.

In the technical solution in the embodiments of this application, the foregoing deviation correction apparatus 10 is used to perform deviation correction for the first electrode plate 22 and the second electrode plate 23, so that an error between a centerline of the first electrode plate 22 and/or the second electrode plate 23 and a preset centerline is kept within a predetermined range, thereby ensuring alignment of the anode plate and the cathode plate in a wound electrode assembly, which improves a yield of superior wound cells, reduces scrapping of the wound cells caused by a difference in the width of the electrode plate 20, reduces difficulty of operation by a staff member, and further improves the quality of the wound cells.

It can be understood that the winding machine 50 may alternatively include more components, and the structure shown in FIG. 5 does not limit the implementation of the winding machine 50.

For more ease of understanding of the technical solution provided by the embodiments of this application, refer to FIG. 6, which is a schematic diagram of a deviation correction process corresponding to the deviation correction scheme shown in FIG. 3.

The deviation correction process includes: detecting, by a line scan camera in real time, edge positions of two sides of an active material coating layer of an electrode plate during a belt transport process of the electrode plate 20 (a moving process of the electrode plate on a conveyor belt), and calculating distances from the reference label 111 fixed in a field of view of the camera. The line scan camera outputs centerline positions of the active material coating layer of the electrode plate in real time to the deviation correction mechanism 13. When a width of the active material coating layer of the electrode plate changes or the electrode plate 20 deviates during the belt transport process, the deviation correction mechanism 13 can perform deviation correction in real time according to a value calculated for centerline detection, to ensure a deviation correction effect of the active material coating layer of the electrode plate during the battery cell winding process.

Figure 7:
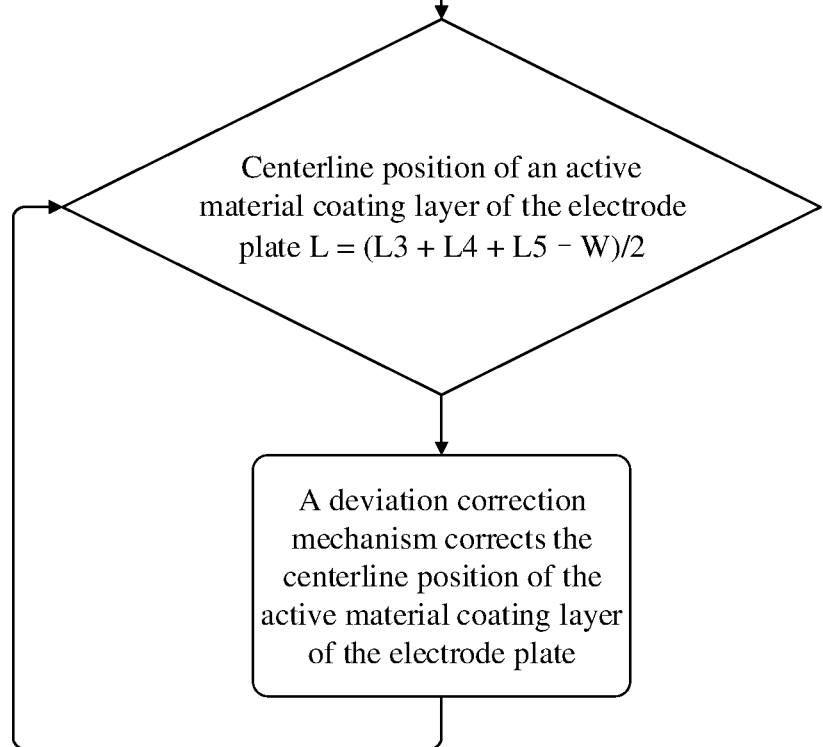
FIG. 7 is a diagram of a deviation correction process according to an embodiment of this application.

Refer to FIG. 7, which is a schematic diagram of a deviation correction process corresponding to the deviation correction scheme shown in FIG. 4.

The deviation correction process includes: detecting, by edge sensors on two sides of an electrode plate, edge positions of the electrode plate during a belt transport process of the electrode plate 20 (a moving process of the electrode plate on a conveyor belt), and detecting, by an area scan camera, a width of a protective coating layer of the electrode plate. Photoelectric sensors output edge positions of two sides of the electrode plate, and the area scan camera outputs the width of the protective coating layer of the electrode plate, so that a centerline position parameter of the active material coating layer of the electrode plate is calculated and given to the deviation correction mechanism 13. When the width of the active material coating layer of the electrode plate changes or the electrode plate deviates during the belt transport process, the deviation correction mechanism 13 can perform deviation correction in real time according to a value calculated for centerline detection, to ensure a deviation correction effect of the active material coating layer of the electrode plate during the battery cell winding process.

Figure 8:
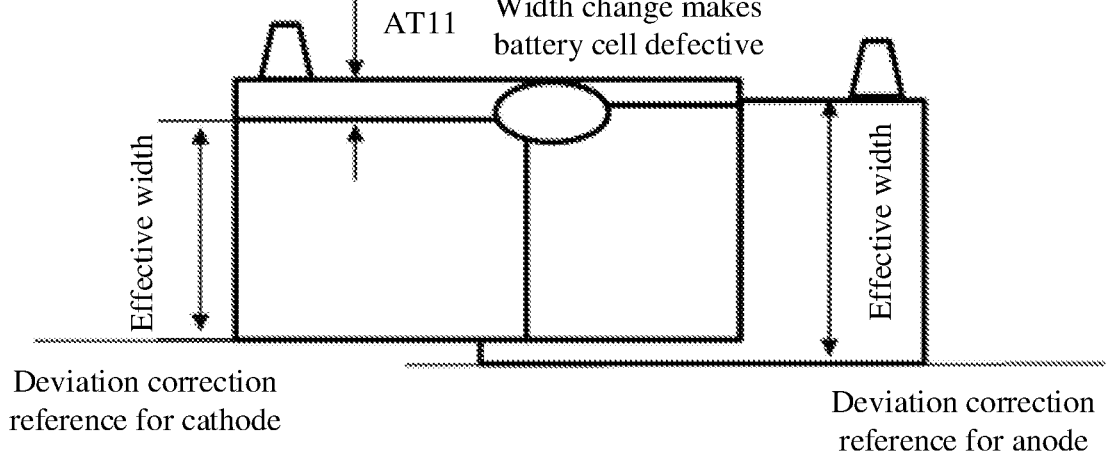
FIG. 8 is a schematic diagram of a prior-art deviation correction scheme provided in this application.

Refer to FIG. 8, which is a schematic diagram of edge position deviation correction provided in an embodiment of this application. If this deviation correction scheme is used, corresponding edges of the electrode plate are used as deviation correction references for the anode and the cathode. Without manual intervention, after the deviation correction mechanism 13 performs deviation correction, a result of the anode enclosing the cathode on the top of the battery cell may be out of specification, resulting in a defective battery cell being scrapped. Therefore, it is necessary to manually adjust the deviation correction reference to ensure the quality of battery cells.

Figure 9:
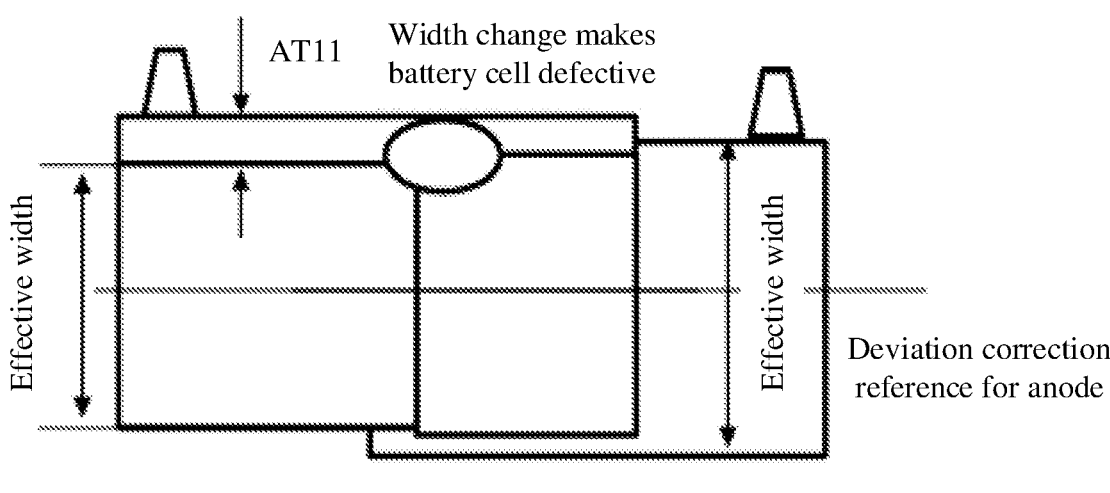
FIG. 9 is a schematic diagram of a deviation correction scheme according to an embodiment of this application.

Refer to FIG. 9, which is a schematic diagram of center position deviation correction used in an embodiment of this application. With the center position deviation correction method, a centerline of an effective electrode plate width is used as a reference. When a width of an incoming material is abnormal, the deviation correction mechanism 13 performs deviation correction based on a centerline of an effective electrode plate width, and the abnormal width part is divided to two sides, which reduces a probability that a result of the anode enclosing the cathode of the battery cell is out of specification, so that the width change of the incoming material can be more effectively handled without manual intervention.

AT11 shown in FIG. 8 and FIG. 9 is a ceramic edge of a horizontal cathode, which is a part of the cathode plate, and the corresponding coating layer may be a protective coating layer of the cathode plate or a non-protective coating layer. This is not limited herein.

Therefore, compared with existing edge position deviation correction schemes, the center position deviation correction scheme in this embodiment of this application can achieve more effective and accurate deviation correction, making centerlines of the anode plate and the cathode plate of the battery cell remain aligned, which improves a yield of superior wound cells, reduces scrapping of the wound cells caused by a difference in the width of the electrode plate, reduces difficulty of operation by a staff member, and further improves the quality of the wound cells.

The foregoing descriptions are merely the embodiments of this application, but are not intended to limit the protection scope of this application. Persons skilled in the art understand that this application may have various modifications and variations. Any modification, equivalent replacement, and improvement made without departing from the spirit and principle of this application shall fall within the protection scope of this application.

What is claimed is:

1. A deviation correction apparatus, comprising:
a width detecting apparatus configured to detect a width of a coating layer of an electrode plate;
a processor communicatively connected with the width detecting apparatus, and configured to determine a centerline position of the electrode plate based on the width of the coating layer; and
a deviation correction mechanism, configured to perform deviation correction for the electrode plate based on the centerline position of the electrode plate and a preset standard centerline position;
wherein:
the width detecting apparatus comprises:
a detecting apparatus, wherein the detecting apparatus has a detection range greater than a width of the electrode plate; and
a reference label, wherein the reference label is provided on a side of the electrode plate, and the reference label is within the detection range of the detecting apparatus; and
the detecting apparatus is configured to detect a distance between an edge of the coating layer and the reference label.

2. The deviation correction apparatus according to claim 1, wherein:
the coating layer comprises a first coating layer and a second coating layer disposed adjacently to each other in a preset direction;
the first detecting apparatus is configured to detect a first distance between the reference label and an edge of the first coating layer on a side close to the reference label and a second distance between the reference label and an edge of the second coating layer on a side close to the reference label; and the processor is configured to determine a distance between the centerline position of the electrode plate and the reference label based on the first distance and the second distance, and determine the centerline position of the electrode plate based on the distance between the centerline position of the electrode plate and the reference label and a position of the reference label.

3. The deviation correction apparatus according to claim 2, wherein the distance between the centerline position of the electrode plate and the reference label equals half of a sum of the first distance and the second distance.

4. The deviation correction apparatus according to claim 2, wherein the first coating layer includes an active material coating layer of the electrode plate and the second coating layer includes a protective coating layer of the electrode plate.

5. The deviation correction apparatus according to claim 1, wherein the detecting apparatus includes a line scan camera.

6. The deviation correction apparatus according to claim 1, wherein:

the coating layer comprises a first coating layer and a second coating layer disposed adjacently to each other in a preset direction; and the width detecting apparatus comprises:

a first edge detecting apparatus, configured to detect a first detection value of a side edge of the first coating layer away from the second coating layer;

a second edge detecting apparatus, configured to detect a second detection value of a side edge of the second coating layer away from the first coating layer; and a detecting apparatus, configured to detect a width of the second coating layer in the preset direction; and the processor is further configured to:

obtain a spacing between a disposing position of the first edge detecting apparatus and a disposing position of the second edge detecting apparatus;

based on the first detection value, the second detection value, the spacing, and the width of the second coating layer in the preset direction, determine a distance between the centerline position of the electrode plate and the side edge of the first coating layer away from the second coating layer; and determine the centerline position of the electrode plate based on a position of the side edge of the first coating layer away from the second coating layer and the distance.

7. The deviation correction apparatus according to claim 6, wherein the distance equals a half of a difference between:

a sum of the first detection value, the second detection value, and the spacing, and the width of the second coating layer in the preset direction.

8. The deviation correction apparatus according to claim 6, wherein the first coating layer includes an active material coating layer of the electrode plate and the second coating layer includes a protective coating layer of the electrode plate.

9. The deviation correction apparatus according to claim 6, wherein the first edge detecting apparatus and the second edge detecting apparatus include photoelectric sensors, and the detecting apparatus includes an area scan camera.

10. A winding machine, comprising:

a winding mandrel, configured to wind a first electrode plate, a separator, and a second electrode plate; and a deviation correction apparatus configured to perform deviation correction for the first electrode plate and the second electrode plate, so that an error between a centerline of the first electrode plate and/or a centerline of the second electrode plate and a preset centerline is kept within a predetermined range, to ensure alignment of the first electrode plate and the second electrode plate in a wound electrode assembly, the deviation correction apparatus comprising:

a width detecting apparatus configured to detect a width of a coating layer of the first electrode plate or the second electrode plate;

a processor communicatively connected with the width detecting apparatus, and configured to determine a centerline position of the first electrode plate or the second electrode plate based on the width of the coating layer; and a deviation correction mechanism, configured to perform deviation correction for the first electrode plate or the second electrode plate based on the centerline position of the first electrode plate or the second electrode plate and a preset standard centerline position;

wherein:

the width detecting apparatus comprises:

a detecting apparatus, wherein the detecting apparatus has a detection range greater than a width of the first electrode plate or the second electrode; and a reference label, wherein the reference label is provided on a side of the first electrode plate or the second electrode, and the reference label is within the detection range of the detecting apparatus; and the detecting apparatus is configured to detect a distance between an edge of the coating layer and the reference label.

11. A deviation correction apparatus, comprising:

a width detecting apparatus configured to detect a width of a coating layer of an electrode plate;

a processor communicatively connected with the width detecting apparatus, and configured to determine a centerline position of the electrode plate based on the width of the coating layer; and a deviation correction mechanism, configured to perform deviation correction for the electrode plate based on the centerline position of the electrode plate and a preset standard centerline position;

wherein:

the coating layer comprises a first coating layer and a second coating layer disposed adjacently to each other in a preset direction;

the width detecting apparatus comprises:

a first edge detecting apparatus, configured to detect a first detection value of a side edge of the first coating layer away from the second coating layer;

a second edge detecting apparatus, configured to detect a second detection value of a side edge of the second coating layer away from the first coating layer; and a detecting apparatus, configured to detect a width of the second coating layer in the preset direction; and the processor is further configured to:

obtain a spacing between a disposing position of the first edge detecting apparatus and a disposing position of the second edge detecting apparatus;

based on the first detection value, the second detection value, the spacing, and the width of the second coating layer in the preset direction, determine a distance between the centerline position of the electrode plate and the side edge of the first coating layer away from the second coating layer; and determine the centerline position of the electrode plate based on a position of the side edge of the first coating layer away from the second coating layer and the distance.

* * * * *